United States Patent
Buchanan

(10) Patent No.: US 9,075,253 B2
(45) Date of Patent: Jul. 7, 2015

(54) THERMOCHROMIC GLAZINGS

(71) Applicant: PPG Industries Ohio, Inc., Cleveland, OH (US)

(72) Inventor: Michael Buchanan, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/204,049

(22) Filed: Mar. 11, 2014

(65) Prior Publication Data

US 2014/0268291 A1  Sep. 18, 2014

Related U.S. Application Data

(60) Provisional application No. 61/777,228, filed on Mar. 12, 2013.

(51) Int. Cl.
*G02F 1/01* (2006.01)

(52) U.S. Cl.
CPC .................................... *G02F 1/0147* (2013.01)

(58) Field of Classification Search
USPC ............ 359/288, 321, 241; 345/106; 250/330
See application file for complete search history.

(56) References Cited

U.S. PATENT DOCUMENTS

| | | | |
|---|---|---|---|
| 6,084,702 A | 7/2000 | Byker et al. | |
| 6,446,402 B1 | 9/2002 | Byker et al. | |
| 8,422,113 B2 * | 4/2013 | Moon et al. | 359/288 |
| 2013/0229702 A1 * | 9/2013 | Broekhuis et al. | 359/288 |

* cited by examiner

*Primary Examiner* — Tuyen Tra
(74) *Attorney, Agent, or Firm* — Andrew C. Siminerio

(57) ABSTRACT

A thermochromic window system includes at least one substrate and a thermochromic layer applied onto the at least one substrate. The thermochromic layer includes at least two thermochromic films and at least one non-thermochromic colored film positioned between the thermochromic films. The at least one substrate can be selected from glass, plastic, or mixtures thereof. The at least one non-thermochromic colored film can also include light absorbers.

20 Claims, No Drawings

THERMOCHROMIC GLAZINGS

CROSS REFERENCE TO RELATED APPLICATION

This application claims priority to U.S. Provisional Application No. 61/777,228 filed Mar. 12, 2013, herein incorporated by reference in its entirety.

BACKGROUND OF THE INVENTION

1. Field of the Invention

The present invention relates to thermochromic glazings and, in particular, to thermochromic glazings with improved color.

2. Description of Related Art

Thermochromic materials are used to adjust the transmission of solar light through a window system. By controlling the amount of solar light that is transmitted through a window, the amount of heat entering a building can also be controlled. Thus, windows that incorporate thermochromic materials help reduce energy costs during hot days by blocking the sun's energy. Thermochromic materials can also be used in other window systems to increase safety by reducing glare from sunlight.

Typically, thermochromic materials are placed between two glass substrates that form a laminate window system. As solar light enters one of the glass substrates, the temperature within the window system increases in temperature causing the thermochromic materials to change color and darken the window system. The amount of tint and degree of color change within the window system varies based on the temperature. Thus, the stronger the sunlight, the stronger the color change.

Ideally, different thermochromic materials could be incorporated into window systems to produce different colors. However, current thermochromic window systems can only produce a limited selection of colors and tints. In addition, current thermochromic window systems can only reach a particular temperature because of the difficulty in heating the window system. A need, therefore, exists for thermochromic window systems that can produce a variety of colors and that can reach high temperatures in a reasonable amount of time.

SUMMARY OF THE INVENTION

In accordance with one embodiment of the present invention, a thermochromic layer includes at least two thermochromic films and at least one colored non-thermochromic film positioned between the at least two thermochromic films. The at least one colored non-thermochromic film can include light absorbers selected from infrared (IR) light absorbers, ultraviolet light absorbers, visible light absorbers, and combinations thereof.

In another embodiment according to the present invention, a thermochromic window system includes at least one substrate and a thermochromic layer applied onto the at least one substrate. The thermochromic layer includes at least two thermochromic films and at least one non-thermochromic colored film positioned between the thermochromic films. The at least one substrate can be selected from glass, plastic, or mixtures thereof. At least one of the thermochromic films can be a colored film and can be formed into a polyvinyl butyral (PVB) sheet. The at least one non-thermochromic colored film can be formed into a polyethyleneterephthalate (PET) sheet. The at least one non-thermochromic colored film can also include light absorbers.

In another embodiment according to the present invention, a thermochromic glazed laminate includes at least one outer glass substrate, at least one inner glass substrate, and a thermochromic layer positioned between the at least one outer glass substrate and the at least one inner glass substrate. The thermochromic layer includes at least two thermochromic films and at least one non-thermochromic colored film positioned between the at least two thermochromic films. The thermochromic glazed laminate can be used to form part of an insulated glass unit.

In yet another embodiment according to the present invention, the thermochromic layer includes at least two thermochromic films and at least one clear non-thermochromic film positioned between the at least two thermochromic films where the at least one clear non-thermochromic film includes light absorbers selected from IR light absorbers, ultraviolet light absorbers, visible light absorbers, and combinations thereof.

DESCRIPTION OF THE PREFERRED EMBODIMENTS

It is to be understood that the invention can assume various alternative orientations and, accordingly, spatial or directional terms, such as "left", "right", "inner", "outer", "above", "below", and the like, are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the Doctrine of Equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Additionally, all documents, such as, but not limited to, issued patents and patent applications, referred to herein are to be considered to be "incorporated by reference" in their entirety. Any reference to amounts, unless otherwise specified, is "by weight percent".

For purposes of the following discussion, the invention will be discussed with reference to a window system. As used herein, the term "window system" refers to any transparency located on a building, such as, but not limited to, windows and sky lights. However, it is to be understood that the invention is not limited to use in windows and sky lights on a building but could be practiced with transparencies in any desired field, such as, but not limited to, laminated or non-laminated residential and/or commercial windows, insulating glass units, and/or transparencies for land, air, space, above water, and underwater vehicles. Therefore, it is to be understood that the specifically disclosed exemplary embodiments are presented simply to explain the general concepts of the invention, and that the invention is not limited to these specific exemplary embodiments.

As noted above, the present invention relates to window systems that incorporate thermochromic materials. As used herein, the term "thermochromic materials" refers to materials that change color due to a change in temperature. The thermochromic materials used with the present invention can be incorporated into the window systems as a film, coating, layer, or through any other suitable means that are capable of producing window systems having the thermochromic properties described herein. As used herein, the term "film" refers to a material or article formed from a composition. A "layer" can comprise one or more "films".

In one embodiment according to the present invention, a thermochromic layer is used with a window system. The thermochromic layer can include at least one thermochromic film. In other embodiments, the thermochromic layer includes at least two thermochromic films. When at least two thermochromic films are used, the thermochromic films can be positioned together without a barrier separating the films. Alternatively, the thermochromic films can be separated by a separating layer, film, or substrate. The thermochromic films suitable for use with the present invention can be made of any material that is capable of changing color as the temperature of the material increases. Non-limiting examples of thermochromic materials suitable for use with the present invention are disclosed in U.S. Pat. Nos. 6,446,402 and 6,084,702, which are incorporated herein by reference. In certain embodiments, the thermochromic films are made into polymeric sheets. As used herein, the term "polymeric sheet" refers to a sheet made of a polymer. The term "polymer" includes oligomers, homopolymers, copolymers, and terpolymers, e.g., polymers formed from two or more types of monomers or polymers. A non-limiting example of a polymeric material that can be used to make the polymeric thermochromic sheet includes polyvinyl butyral (PVB). In certain embodiments, the thermochromic material can be added during the polymerization process of the polymeric sheet. Alternatively, the thermochromic material can be added prior to or after the polymerization process. For instance, the thermochromic material can be added to the polymeric sheet after the polymeric sheet is formed. When the thermochromic layer includes at least two thermochromic films, the thermochromic films can be made of the same material or they can be made of different materials.

Further, the thermochromic films used with the present invention can be clear films. As used herein, the term "clear film" refers to non-tinted or non-colored film. Alternatively, the thermochromic films can be tinted or colored films. When the thermochromic layer includes at least two thermochromic films, all the thermochromic films can be made of clear thermochromic films, colored thermochromic films, or combinations thereof. If the thermochromic layer includes only colored thermochromic films, the thermochromic films can be the same color. However, different thermochromic materials absorb light at different wavelengths. As a result, these thermochromic materials exhibit one type of color at a particular temperature. Therefore, in certain embodiments, the thermochromic layer includes at least two thermochromic films that have different colors.

In another embodiment according to the present invention, the thermochromic layer includes a non-thermochromic colored film positioned between the thermochromic films. The non-thermochromic colored film can include any type of color or mixture of colors. The non-thermochromic colored film can be made of any type of material that allows light to be transmitted through the film with little or no haze while acting as a barrier or separating layer between the thermochromic films. In certain embodiments, the non-thermochromic film is a colored polymeric sheet. Non-limiting examples of materials used to make the non-thermochromic colored polymeric sheet include acrylic, polycarbonate, cellulosic materials, polyester, polyurethane, silicon, EVA, PVC, polyethylene, polypropylene, nylon, and combinations thereof. In one embodiment, the non-thermochromic colored film is a polyethyleneterephthalate (PET) lavender tinted polymeric sheet, such as the lavender tinted sheet commercially available from Solar Graphics.

In yet another embodiment, the non-thermochromic colored film contains light absorbers. The light absorbers take in or absorb energy from different spectrums of light, thereby increasing the temperature of the non-thermochromic colored film. The increase in temperature of the non-thermochromic colored film further increases the temperature of the thermochromic materials. The light absorbers can also reduce the heating period necessary to change the temperature and therefore the color of the thermochromic materials. The light absorbers can be positioned on at least a portion of the non-thermochromic colored film. For instance, the light absorbers can be formed on at least a portion of one surface of a non-thermochromic colored polymeric sheet. In one embodiment, the non-thermochromic colored film includes one light absorber. Alternatively, the non-thermochromic colored film includes a plurality of light absorbers.

Non-limiting examples of light absorbers suitable for use with the present invention include, but are not limited to, infrared (IR) light absorbers, ultraviolet light absorbers, visible light absorbers, and mixtures or combinations thereof. As used herein, the term "visible light absorber" refers to molecules or compounds that absorb electromagnetic energy in the range of 380 nanometers (nm) to 800 nm. As used herein, the term "ultraviolet light absorber" refers to molecules or compounds that absorb electromagnetic energy in the range of 300 nm to less than 380 nm. As used herein, the term "IR light absorber" refers to molecules or compounds that absorb electromagnetic energy in the range of greater than 800 nm to 100,000 nm.

In certain embodiments, the non-thermochromic film can be a clear film. Non-limiting examples of materials that can be used to form the non-thermochromic clear film include any of the materials described above with the non-thermochromic colored film and which are formed as a clear film instead. In these embodiments, the non-thermochromic clear film includes light absorbers. Non-limiting examples of light absorbers include, but are not limited to, infrared (IR) light absorbers, ultraviolet light absorbers, visible light absorbers, and mixtures or combinations thereof. In one embodiment, the non-thermochromic clear film contains IR absorbers. The light absorbers take in or absorb energy from different spectrums of light, thereby increasing the temperature of the non-thermochromic clear film as described above.

In accordance with another embodiment of the present invention, the thermochromic layer is positioned on at least one substrate. Alternatively, the thermochromic layer is positioned between at least two substrates. As described in detail above, the thermochromic layer can include light absorbers such as having light absorbers on the non-thermochromic film. These light absorbers can accelerate and improve the heating performance of the thermochromic films. The ability of the light absorbers to increase the temperature of the thermochromic films is particularly beneficial when thicker substrates and/or multiple substrates are used with the thermochromic layer. The light absorbers also make it possible to use a larger variety of substrates.

Examples of suitable materials for the substrates include, but are not limited to, plastic substrates such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof; glass substrates; or mixtures or combinations of any of the above. For example, one or more of the substrates can include conventional soda-lime-silicate glass, borosilicate glass, or leaded glass. The glass can be clear glass. "Clear glass" refers to non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties. "Float glass" refers to glass formed by a conventional float process in which molten glass is deposited onto a molten metal bath and controllably cooled to form a float glass ribbon.

The substrates used with the present invention can be, for example, clear float glass or can be tinted or colored glass or one substrate can be clear glass and the other substrates colored glass. The substrates can be of any desired dimensions, e.g., length, width, shape, or thickness. In one exemplary transparency, the substrates can each be 1 mm to 10 mm thick, such as 1 mm to 8 mm thick, such as 2 mm to 8 mm, such as 3 mm to 7 mm, such as 5 mm to 7 mm, such as 6 mm thick. Non-limiting examples of glass that can be used for the practice of the invention include clear glass, Starphire® glass, Solargreen® glass, Solextra® glass, GL-20® glass, GL35™ glass, Solarbronze® glass, Solargray® glass, Pacifica® glass, SolarBlue® glass, and Optiblue® glass, all commercially available from PPG Industries, Inc. of Pittsburgh, Pa.

Additionally, the glass can be a coated glass. For example, the glass substrate can be a low emissivity (low-e) coated glass. Examples of low-e coatings suitable for use with the present invention include, but are not limited to, the Sungate® glass and Solarban® glass family of coated glasses, which are commercially available from PPG Industries, Inc. of Pittsburgh, Pa. Other coatings suitable for use with the present invention include, as an example and without limitation, IR reflecting coatings, solar control coatings, and the like.

The substrates used with the present invention can form laminated windows. As used herein, the term "laminated window" refers to a window that is made up of multiple substrates, e.g., two substrates, made of glass, plastic, or combinations thereof that sandwich one or more interlayers. When the interlayer includes a thermochromic layer having at least one non-thermochromic colored film, the laminated window can change to a color that is different than the color that would be observed with a laminated window having the thermochromic layers currently available. Further, when the non-thermochromic colored film contains at least one light absorber, the thermochromic films can reach higher temperatures and obtain darker colors.

In another embodiment according to the present invention, the thermochromic layer is used with an insulated glass unit (IGU). As used herein, an "insulated glass unit" refers to a window made up of multiple substrates, e.g., two substrates, made of glass, plastic, or combinations thereof with air or inert gas located between at least two of the substrates. For instance, the IGU can have an outer pane of glass directly exposed to a light source, a middle pane of glass, and an inner pane of glass with air located in a gap between the middle and inner panes of glass. The thermochromic layer described herein can act as an interlayer between at least two of the substrates of the IGU. In certain embodiments, a thermochromic interlayer is positioned between the outer and middle panes of glass of the IGU. As with the window systems described above, when the interlayer includes a thermochromic layer having at least one non-thermochromic colored film, the IGU can change to a color that is different than the color that would be observed with an IGU having the thermochromic layers currently available. Further, when the non-thermochromic colored film contains at least one light absorber, the thermochromic films can reach higher temperatures and obtain darker colors.

The following Examples illustrate various embodiments of the invention. However, it is to be understood that the invention is not limited to these specific embodiments.

EXAMPLE 1

In the following Example, light transmittance was measured in laminated window systems at room temperature using a Minolta CM-3700d spectrophotometer. As used in the examples, "T" refers to the transmittance through the article. The laminated windows used with the following samples are composed of an outer 6 mm glass pane, an inner 6 mm glass pane, and a thermochromic interlayer positioned between the outer and inner glass panes. As used with the following example, an "outer glass pane" refers to the pane of glass that is directly exposed to a light source.

The results obtained from the spectrometer were used to calculate the color coordinates a* and b*. The color coordinates a* and b* are those of the CIELAB system (1976) with illuminant D65 and the 1964 10° standard observer that will be understood by one of ordinary skill in the art.

Sample 1

A thermochromic layer was used as an interlayer between an outer 6 mm pane of Optiblue® glass and an inner 6 mm pane of clear glass. The thermochromic layer had the following structure: a tan colored PVB thermochromic sheet positioned near the outer Optiblue® glass, a blue colored PVB thermochromic sheet positioned near the inner clear glass, and a lavender colored PET non-thermochromic sheet positioned between the tan and blue colored PVB thermochromic sheets.

Comparative Sample 1

A thermochromic layer was used as an interlayer between an ou 6 mm pane of Optiblue® glass and an inner 6 mm pane of clear glass. The thermochromic layer had the following structure: a tan colored PVB thermochromic sheet positioned near the outer Optiblue® glass, a blue colored PVB thermochromic sheet positioned near the inner clear glass, and a clear PET non-thermochromic sheet positioned between the tan and blue colored PVB thermochromic sheets.

Sample 2

A thermochromic layer was used as an interlayer between an outer 6 mm pane of clear glass and an inner 6 mm pane of clear glass. The thermochromic layer had the following structure: a tan colored PVB thermochromic sheet positioned near the outer clear glass, a blue colored PVB thermochromic sheet positioned near the inner clear glass, and a lavender colored PET non-thermochromic sheet positioned between the tan and blue colored PVB thermochromic sheets.

Comparative Sample 2

A thermochromic layer was used as an interlayer between an outer 6 mm pane of clear glass and an inner 6 mm pane of clear glass. The thermochromic layer had the following structure: a tan colored PVB thermochromic sheet positioned near the outer clear glass, a blue colored PVB thermochromic sheet positioned near the inner clear glass, and a clear PET non-thermochromic sheet positioned between the tan and blue colored PVB thermochromic sheets.

The color coordinates a* and b* of each of the samples described above were calculated based on the results obtained from the spectrometer. Table 1 below shows the color coordinates of each of the samples.

TABLE 1

| Sample No. | Ta* | Tb* |
| --- | --- | --- |
| Sample 1 | −3.79 | −14.19 |
| Comparative Sample 1 | −10.29 | −0.85 |
| Sample 2 | −6.11 | −9.59 |
| Comparative Sample 2 | −11.45 | 5.37 |

EXAMPLE 2

In the following Example, light transmittance was measured in an IGU window system at room temperature using a HunterLab UltraScan® PRO spectrophotometer. As used in the examples, "T" refers to the transmittance through the article. The IGU window system used with the following sample is composed of an outer 6 mm glass pane, an inner 6 mm glass pane, and a middle 6 mm glass pane positioned between the outer and inner glass panes. A 0.5 inch air gap is located between the middle and inner glass panes. A thermochromic interlayer was positioned between the outer and middle glass panes. As used with the following examples, an "outer glass pane" is the pane of glass in an IGU that is directly exposed to a light source.

Sample 1

The IGU included an outer 6 mm pane of clear glass, an inner 6 mm pane of Solarban® 70XL glass, and a middle 6 mm pane of clear glass positioned between the outer and inner panes of glass. A 0.5 inch air gap is located between the middle and inner panes of glass. A thermochromic layer was used as an interlayer between the outer and middle panes of clear glass. The thermochromic layer had the following structure: a tan colored PVB thermochromic sheet positioned near the outer clear glass, a blue colored PVB thermochromic sheet positioned near the middle clear glass, and a lavender colored PET non-thermochromic sheet positioned between the tan and blue colored PVB thermochromic sheets.

The color coordinates a* and b* of the sample were calculated based on the results obtained from the spectrometer. Table 2 below shows the color coordinates of the sample.

TABLE 2

| Sample No. | Ta* | Tb* |
| --- | --- | --- |
| Sample 1 | −8.20 | −5.36 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A thermochromic window system comprising:
   at least one substrate; and
   a thermochromic layer applied onto the at least one substrate, wherein the thermochromic layer comprises at least two thermochromic films and at least one non-thermochromic colored film positioned between the thermochromic films.

2. The thermochromic window system according to claim 1, wherein the at least one substrate is selected from the group consisting of glass and plastic.

3. The thermochromic window system according to claim 2, wherein the at least one substrate comprises two substrates.

4. The thermochromic window system according to claim 3, wherein the thermochromic layer is positioned between the two substrates.

5. The thermochromic window system according to claim 3, wherein at least one of the two substrates comprises a colored glass.

6. The thermochromic window system according to claim 1, wherein at least one of the thermochromic films is a colored film.

7. The thermochromic window system according to claim 1, wherein at least one of the thermochromic films comprises polyvinyl butyral (PVB).

8. The thermochromic window system according to claim 1, wherein the at least one non-thermochromic colored film comprises polyethyleneterephthalate.

9. The thermochromic window system according to claim 1, wherein the at least one non-thermochromic colored film comprises light absorbers.

10. The thermochromic window system according to claim 9, wherein the light absorbers are selected from IR light absorbers, ultraviolet light absorbers, visible light absorbers, and combinations thereof.

11. A thermochromic glazed laminate comprising:
    at least one outer glass substrate;
    at least one inner glass substrate; and
    a thermochromic layer positioned between the at least one outer glass substrate and the at least one inner glass substrate, wherein the thermochromic layer comprises at least two thermochromic films and at least one non-thermochromic colored film positioned between the at least two thermochromic films.

12. The thermochromic glazed laminate according to claim 11, wherein the at least one outer glass substrate is a colored glass substrate and the at least one inner glass substrate is a clear glass substrate.

13. The thermochromic glazed laminate according to claim 11, wherein at least one of the thermochromic films is a colored film.

14. The thermochromic glazed laminate according to claim 11, wherein the at least one non-thermochromic colored film comprises light absorbers.

15. The thermochromic glazed laminate according to claim 14, wherein the light absorbers are selected from IR absorbers, ultraviolet light absorbers, visible light absorbers, and combinations thereof.

16. An insulated glass unit comprising the thermochromic glazed laminate of claim 11.

17. A thermochromic layer comprising at least two thermochromic films and at least one colored non-thermochromic film positioned between the at least two thermochromic films.

18. The thermochromic layer according to claim 17, wherein at least one of the thermochromic films is a colored film.

19. The thermochromic layer according to claim 17, wherein the at least one non-thermochromic colored film comprises light absorbers.

20. The thermochromic layer according to claim 19, wherein the light absorbers are selected from the group consisting of IR absorbers, ultraviolet light absorbers, visible light absorbers, and combinations thereof.

\* \* \* \* \*